3,595,927
ARALKYL SUBSTITUTED PYROCATECHOLS
Eugene R. Wagner, Zionsville, Ind., assignor to The
  Dow Chemical Company, Midland, Mich.
No Drawing. Filed Oct. 11, 1968, Ser. No. 766,977
           Int. Cl. C07c *39/16*
U.S. Cl. 260—619                          1 Claim

ABSTRACT OF THE DISCLOSURE

Aralkyl substituted pyrocatechol compounds such as 6 - tert - butyl - 3 - (3,5-di-tert-butyl-4-hydroxybenzyl)-4-methylpyrocatechol are prepared from 3-tert-butyl-5-methylpyrocatechol. The compounds are useful in the study of animal sterol metabolism and are particularly useful as agents for reducing cholesterol levels.

BACKGROUND OF THE INVENTION

Description of the prior art

The substituted pyrocatechol compounds of the invention can be prepared by procedures analogous to known methods. Typical methods which can be employed include the reaction of a substituted pyrocatechol with paraformaldehyde or a hydroxymethyl substituted phenol and methods similar to those employed for the preparation of diaryl substituted alkanes such as those disclosed in British Pat. Nos. 1,088,455 and 892,261.

SUMMARY OF THE INVENTION

This invention is directed to aralkyl substituted pyrocatechol compounds and is particularly directed to aralkyl substituted tert-butylmethylpyrocatechol compounds of the formula:

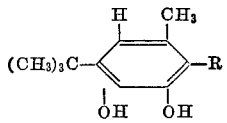

In the present specification and claims, R represents 3,5-di-tert-butyl-4-hydroxybenzyl or 2,3-dihydroxy - 4 - tert-butyl-6-methylbenzyl. The novel compounds are crystalline solids which are soluble in organic liquids such as benzene, acetone, ether and alcohols and only slightly soluble in water. For the sake of convenience, the compounds will be referred to herein simply as "pyrocatechol compounds."

The novel pyrocatechol compounds are useful for administration to animals in studying the metabolism of lipids and in studying sterol metabolism and are particularly useful as hypocholesteremics or agents for reducing levels of cholesterol.

The pyrocatechol compounds of the invention are prepared by the reaction of 3-tert-butyl-5-methylpyrocatechol with 2,6 - di-tert-butyl - 4 - hydroxymethylphenol or paraformaldehyde. The compound wherein R is 2,3-dihydroxy-4-tert-butyl-6-methylbenzyl is prepared by the reaction with paraformaldehyde and the compound wherein R is 3,5-di-tert-butyl-4-hydroxybenzyl is prepared by the reaction wherein 2,6-di-tert-butyl-4-hydroxymethylphenol is employed as a starting material.

The reaction proceeds when the reactants are mixed together in the presence of glacial acetic acid and hydrogen chloride. The reaction proceeds readily at temperatures from about 0° to about 75° C. and is preferably carried out at temperatures of from about 5° to about 30° C. The exact proportions of the reactants to be employed are not critical, some of the desired product being obtained when the reactants are combined in any proportions. However, when 2,6-di-tert-butyl-4-hydroxymethylphenol is employed as a starting material, the reaction consumes the reactants in equimolar proportions and the use of the 3-tert-butyl-5-methylpyrocatechol and 2,6-di-tert-butyl-4-hydroxymethylphenol reactants in such proportions is preferred in this case. The reaction with the paraformaldehyde starting material consumes two molar proportions of 3-tert-butyl-5-methylpyrocatechol for each molar proportion of paraformaldehyde consumed, and the use of these reactants in such proportions is preferred. The reactants are preferably mixed with hydrogen chloride by passing excess hydrogen chloride gas through a solution of the reactants in glacial acetic acid. The product precipitates in the reaction mixture and can be separated by conventional procedures such as cooling the reaction mixture to enhance precipitation followed by decantation, filtration or centrifugation. The product can be purified by conventional procedures such as recrystallization and washing. The product thus obtained can be administered to animals or further purified by conventional procedures.

In a convenient procedure for the preparation of the pyrocatechol compounds of the invention, the 3-tert-butyl-5-methylpyrocatechol reactant and the 2,6-di-tert-butyl-4-hydroxymethylphenol or paraformaldehyde reactant are mixed together and dissolved in glacial acetic acid in any order or fashion. The reaction mixture is then maintained at a temperature within the reaction temperature zone while gaseous hydrogen chloride is passed through the mixture for a period sufficient for the reaction to go to completion, generally from about one to about three hours. The product can be separated conveniently by cooling the reaction mixture and filtering the mixture to obtain the product as a filter cake. The product can be purified by conventional procedures such as washing, recrystallization or treatment with activated charcoal.

DESCRIPTION OF THE PREFERRED EMBODIMENTS

The following examples illustrate the invention but are not to be construed as limiting the same.

EXAMPLE 1

3 - tert - butyl - 5 - methylpyrocatechol (20 grams; 0.11 mole) and paraformaldehyde (1.65 grams; 0.055 mole) are mixed together with 9 milliliters of glacial acetic acid. The mixture is warmed slightly until the reactants are completely dissolved in the glacial acetic acid, after which the reaction mixture is chilled in an ice bath while gaseous hydrogen chloride is passed therethrough for a period of 1.5 hours. A precipitate forms in the reaction mixture during the reaction period. The reaction mixture is filtered and the filter cake is washed with water and dissolved in 50 milliliters of hot benzene. The benzene solution is dried over anhydrous sodium sulfate and filtered. The filtrate is cooled in an ice bath until precipitation of the product is complete. The mixture is filtered and the filter cake is washed with hexane and treated with activated charcoal. The 3,3' - methylenebis(6 - tert - butyl-4-methylpyrocatechol) product is recrystallized from benzene and found to melt at a temperature of 170°–171° C. The structure of the product is confirmed by elemental analysis and by infrared and nuclear magnetic resonance spectroscopic analyses.

EXAMPLE 2

3 - tert - butyl - 5 - methylpyrocatechol (0.05 mole) and 2,6 - di - tert - butyl - 4 - hydroxymethylphenol (0.05 mole) are mixed together with 10 milliliters of glacial acetic acid and the mixture is warmed until the solid material goes into solution. The mixture is cooled in an ice bath for 1.75 hours, during which time excess hydrogen chloride gas is passed through the mixture. The mixture is held overnight at a temperature of 0°–5° C. to insure that precipitation of the product is complete. The mixture is filtered and the filter cake is washed with water and dissolved in hot benzene. The benzene solution is dried over anhydrous sodium sulfate, filtered, concentrated by evaporation in vacuo and the concentrated mixture is cooled until precipitation of the product is complete. The 6-tert-butyl-3-(3,5 - di - tert - butyl - 4 - hydroxybenzyl)-4-methylpyrocatechol product is found to melt at a temperature of 140.5°–141.5° C. The structure of the product is confirmed by elemental analysis and by nuclear magnetic resonance and infrared spectroscopic analyses.

The pyrocatechol compounds of the invention can be administered to animals in the study of sterol metabolism and for lowering of cholesterol levels. Compounds are typically administered to animals at varying dosage rates, depending upon the particular compound employed and upon such factors as age, species, size and physical condition of the animal, route of administration and the effect to be produced. The compounds are preferably administered as compositions comprising one or more compounds of the invention and one or more pharmaceutical excipients including inert diluents, dispersing agents, binders, wetting agents, foodstuffs or the like. The pyrocatechol compounds can be administered in hypocholesteremic amounts either orally in the form of tablets, elixirs, emulsions or the like or by injection in the form of sterile injectable solutions or suspensions.

In a representative operation, pyrocatechol compounds of the invention are mixed together separately with separate portions of balanced rodent mash to prepare separate compositions each containing about 0.12 percent by weight of a pyrocatechol compound. Separate groups of mice of the same origin and past history are fed for two weeks on separate diets consisting of one of the above-described compositions. Based on observations of average consumption of the composition and the concentration of the test compound, each mouse receives an estimated oral dosage of about 240 milligrams of test compound per kilogram of animal body weight per day. Separate groups of similar male mice are fed for two weeks on a diet consisting of an identical rodent mash which contains no test compound to serve as checks. At the end of the two week period, the mice in each group are anesthetized with ether and exsanguinated, and serum cholesterol levels are determined for each mouse by a method similar to that described by Henly, The Analyst, 82, 286 (1957). Average cholesterol levels are calculated for each test group and each check group of mice. The percentage reduction in serum cholesterol level is then calculated by dividing the difference between the cholesterol levels in the test group and the corresponding check group by the cholesterol level in the check group and multiplying the quotient by 100. The results indicate that serum cholesterol levels are reduced by 19 percent in the mice administered 6-tert-butyl-3-(3,5-di-tert-butyl - 4 - hydroxybenzyl) - 4 - methylpyrocatechol and by 37 percent in the mice administered 3,3'-methylene-bis(6-tert-butyl-4-methylpyrocatechol) as compared to the serum cholesterol levels found with the untreated check mice.

What is claimed is:
1. A member of the group consisting of 3,3'-methylenebis(6 - tert - butyl - 4 - methylpyrocatechol) and 6-tert-butyl - 3 - (3,5 - di - tert - butyl - 4 - hydroxybenzyl)-4-methylpyrocatechol.

References Cited
UNITED STATES PATENTS

| | | | |
|---|---|---|---|
| 2,542,972 | 2/1951 | Thompson | 260—610(A) |
| 2,763,672 | 9/1956 | Young et al. | 260—619(A) |
| 3,053,803 | 9/1962 | Jaffe et al. | 260—619(A) |
| 3,055,862 | 9/1962 | Bentley | 260—619(A) |

BERNARD HELFIN, Primary Examiner

U.S. Cl. X.R.
260—999; 424—346